(12) United States Patent
Green et al.

(10) Patent No.: US 7,174,141 B2
(45) Date of Patent: *Feb. 6, 2007

(54) APPARATUS, AND ASSOCIATED METHOD, FOR FACILITATING COMMUNICATIONS IN A RADIO COMMUNICATION SYSTEM THROUGH USE OF ULTRAWIDE BAND SIGNALS

(75) Inventors: Marilynn P. Green, Pomona, NY (US); Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 196 days.

This patent is subject to a terminal disclaimer.

(21) Appl. No.: 10/836,632

(22) Filed: Apr. 30, 2004

(65) Prior Publication Data

US 2005/0245268 A1 Nov. 3, 2005

(51) Int. Cl.
*H04B 1/18* (2006.01)

(52) U.S. Cl. ............... 455/161.3; 455/161.1; 455/450; 455/452.2; 375/130; 370/252; 370/329; 370/350; 370/503

(58) Field of Classification Search ............ 455/10, 455/21, 424–426.1, 436, 440, 450, 456.1, 455/456.6, 504, 524–525; 701/200, 207, 701/300; 375/260, 130, 150, 343, 250; 342/42, 342/44, 47, 132, 133, 357.01, 357.02, 375, 342/385–387, 450, 453, 458; 370/252, 254, 370/329, 331, 335, 342, 350, 441, 479, 503
See application file for complete search history.

(56) References Cited

U.S. PATENT DOCUMENTS

| | | | | |
|---|---|---|---|---|
| 5,589,838 A | * | 12/1996 | McEwan | 342/387 |
| 6,054,950 A | * | 4/2000 | Fontana | 342/463 |
| 6,133,876 A | * | 10/2000 | Fullerton et al. | 342/375 |
| 6,437,832 B1 | | 8/2002 | Grabb et al. | |
| 6,483,461 B1 | * | 11/2002 | Matheney et al. | 342/463 |
| 6,519,464 B1 | * | 2/2003 | Santhoff et al. | 455/456.5 |
| 6,700,538 B1 | * | 3/2004 | Richards | 342/458 |
| 6,784,827 B2 | * | 8/2004 | Hirt | 342/42 |
| 6,907,244 B2 | * | 6/2005 | Santhoff et al. | 455/442 |
| 2003/0058974 A1 | * | 3/2003 | Pirainen | 375/348 |
| 2003/0069025 A1 | * | 4/2003 | Hoctor et al. | 455/456 |
| 2003/0198212 A1 | * | 10/2003 | Hoctor et al. | 370/350 |
| 2004/0002346 A1 | * | 1/2004 | Santhoff | 455/456.1 |
| 2004/0185856 A1 | * | 9/2004 | McKenna et al. | 455/445 |
| 2004/0233858 A1 | * | 11/2004 | Karaoguz | 370/254 |
| 2005/0207505 A1 | * | 9/2005 | Lakkis | 375/260 |

* cited by examiner

*Primary Examiner*—William Trost
*Assistant Examiner*—James D Ewart
(74) *Attorney, Agent, or Firm*—Alston & Bird LLP

(57) ABSTRACT

Apparatus, and an associated method, for a radio communication system having a sending station and a receiving station. The sending station sends data pursuant to a communication service and ultrawide band signals pursuant to a selected time-hopping sequence. An ultrawide band signal detector is positioned at the receiving station. The ultrawide band signal detects the ultrawide band signal transmitted thereto. Correlation is made between the detected ultrawide band signal and a locally-generated replica signal. Correlations therebetween are used to facilitate various receiving station operations, such as equalization operations upon received data, time synchronization of the receiving station to the sending station, and position determination of the positioning of the receiving station.

20 Claims, 4 Drawing Sheets

APPARATUS, AND ASSOCIATED METHOD, FOR FACILITATING COMMUNICATIONS IN A RADIO COMMUNICATION SYSTEM THROUGH USE OF ULTRAWIDE BAND SIGNALS

The present invention relates generally to a manner by which to facilitate operation of a communication station, such as a mobile node, operable in a radio communication system, such as a cellular communication system, or a wireless local area network. More particularly, the present invention relates to apparatus, and an associated method, by which to provide and utilize an ultrawide band overlay signal that, when received at the mobile node, or other communication station, is used to improve its performance.

The ultrawide band signal is used, e.g., to form a channel estimate of communication channels upon which communications are effectuated during operation of the radio communication system, to time synchronize the communication stations of the radio communication system, and to determine positioning of the communication station that receives the ultrawide band signal. The ultrawide band signal forms an overlay upon data communication signals and is broadcast as, e.g., a control signal, pursuant to a selected time-hopping, or other code, scheme. The ultrawide band nature of the ultrawide band signal provides for high-resolution communications over short distances, such as the distances defining coverage areas of access points of a WLAN (Wireless Local Area Network) or a microcell of a cellular communication system.

BACKGROUND OF THE INVENTION

A communication system is used to communicate data between communication stations of the communication system. At least one communication station of the communication system forms a sending station that operates to send data. And, at least another of the communication stations forms a receiving station that operates to receive the data sent by a sending station. The data is communicated by the sending station upon a communication channel that extends between the sending and receiving stations. If necessary, the sending station converts the data into a form to permit its communication upon the communication channel. And, the receiving station operates to recover the informational content of the data based upon the data detected at the receiving station.

Many different types of communication systems have been developed and deployed, available for use to effectuate different types of communication services. As advancements in communication technologies permit, implementation of the advancements into existing, as well as new types of, communication systems shall likely permit improved and new communication services to be effectuated.

A radio communication system is an exemplary type of communication system. A radio communication system utilizes radio channels extending between sending and receiving stations and by way of which data is communicated therebetween.

Conventional wireline communication systems, in contrast, require the use of fixed, i.e., wireline connections extending between the sending and receiving stations, upon which to define communication channels. Because radio channels do not require the use of a wireline connection extending between the sending and receiving stations, a radio communication system can be utilized by way of which to effectuate communications when corresponding use of a wireline communication system is not possible. That is to say, free of the need to interconnect the communication stations by way of the wireline connections, communication stations of a radio communication system are positionable at locations between which wireline connections would not be feasible. Additionally, free of the need to interconnect the communication stations by way of wireline connections, a radio communication system is implementable as a mobile communication system in which one or more of the communication stations is permitted mobility.

A cellular communication system is a type of radio communication system. Cellular communication systems include network infrastructures, or networks, that are installed throughout geographical areas that are to be encompassed by the cellular communication system. Significant portions of the populated parts of the world are encompassed by the networks of cellular communication systems, constructed pursuant to various operational specifications, thereby to provide for cellular communication service throughout such populated areas of the world.

The network infrastructure of a cellular communication system includes fixed-site transceivers, sometimes referred to as base transceiver stations, each of which defines a coverage area, sometimes referred to as a cell. Sometimes fixed-site transceivers are constructed or otherwise deployed to provide communication coverage over limited areas, sometimes referred to as microcells. Communications are effectuated between a base transceiver station and a mobile station, or mobile node, when the mobile station is positioned within a coverage area encompassed by a base transceiver station. Other radio communication systems are analogously operable, also constructed to provide for radio communications with mobile stations when the mobile stations are positioned within areas encompassed by network infrastructures of the radio communication system. A wireless local area network (WLAN) is such a radio communication system that exhibits operational characteristics analogous to certain of the characteristics of a cellular communication system. More particularly, the network part of a wireless local area network includes fixed-site transceivers, sometimes referred to as access points, each of which defines a coverage area. A mobile station operable in the wireless local area network is generally capable of communicating with the access point in whose coverage area that the mobile station is positioned.

Cellular communication systems, wireless local area networks, as well as other radio communication systems, are sometimes constructed to utilize digital communication techniques. The use of digital communication techniques provides various communication advantages including, for instance, the capability of communicating data more efficiently. Communication conditions on radio channels by way of which data is communicated during operation of a cellular communication system, a WLAN, or other radio communication system, is generally non-ideal. For instance, fading conditions on the radio channel upon upon which the data is communicated distorts the values of the data. If the fading conditions are significant, and the effects of the fading are not compensated at the receiving station, the informational content of the data cannot correctly be recovered at the receiving station.

Channel equalizers are utilized at receiving stations to compensate for the effects of fading of data communicated upon a channel susceptible to fading. Channel equalizers perform their operations through use of channel estimations in which the communication conditions on the channels are estimated, generally in terms of a channel impulse response.

The performance of the equalizer is dependent, in part, upon the resolution of the channel estimate. Existing cellular communication systems and wireless local area networks are constrained in the resolution of the channel estimate that can be obtained. Generally, the channel estimate is derived by analyzing, or otherwise operating upon, a known sequence of values that are communicated to a communication station by way of a communication channel susceptible to fading. The correlation, or other comparison, of the received sequence of values with the known sequence, free of distortion, is used to estimate the channel. The constraints in the resolution capability is dependent, in part, upon the allocation of system capacity to communicate the sequence of the known values. Increase in the size of the known sequence is limited as such increase decreases the capacity of the system to communicate other data.

The use of ultrawide band (UWB) signaling has been proposed in other types of radio communication systems, such as in commercial television broadcasting. An ultrawide band signal is of large bandwidth, but of low power levels. If ultrawide band signals could be used in a cellular communication system, a wireless local area network, or other radio communication system for channel estimation purposes, improved estimation resolution could be provided. Additional advantages could also be provided through use of ultrawide band signaling in such systems.

It is in light of this background information related to radio communication systems that the significant improvements of the present invention have evolved.

SUMMARY OF THE INVENTION

The present invention, accordingly, advantageously provides apparatus, and an associated method, by which to facilitate operation of a communication station, such as a mobile node, operable in a radio communication system, such as a cellular communication system, or a wireless local area network (WLAN).

Through operation of an embodiment of the present invention, a manner is provided by which to provide and to utilize an ultrawide band overlay signal that, when received at the mobile node, or other communication station, is used to improve its performance.

When received at the mobile node or other communication station, the ultrawide band signal is used, for example, to form a channel estimate of communication channels upon which communications are effectuated during operation of the radio communication system. The ultrawide band signal is further used, for example, to time-synchronize the communication stations of the radio communication system. And, the ultrawide band signal is also used, for example, to determine positioning of the communication station that receives the ultrawide band signal.

In one aspect of the present invention, the ultrawide band signal that is communicated during operation of the radio communication system is generated pursuant to a pseudo-random time-hopping code, such as that which forms a pulse-position modulated signal.

In another aspect of the present invention, the fixed-site transceivers broadcast paging, or analogous, messages, detectable by mobile nodes when positioned within the coverage areas of the fixed-site transceivers. The paging messages include, as portions thereof, indications of the manners by which the ultrawide band signals are coded, such as the pseudorandom time-hopping patterns exhibited by the ultrawide band signals. Thereby, the mobile node is alerted to when the mobile node should monitor for the communication of the ultrawide band signal communicated by a particular fixed-site transceiver. The different ones of the fixed-site transceivers communicate, for instance, ultrawide band signals pursuant to different codes. And, the codes are re-used pursuant to a code re-use scheme.

In another aspect of the present invention, the radio communication system defines a noise floor, and the ultrawide band signal generated during operation of the communication system is generated at a power level that is beneath the noise floor of the communication system. The ultrawide band signal thereby does not interfere with communication of other data during operation of the communication system. And, through use of an appropriate re-use scheme, the ultrawide band signal is generated by different ones of the fixed-site transceivers positioned in proximity to one another do not cumulatively exceed the noise floor, potentially to cause interference with other data communicated during operation of the communication system.

A detector embodied at the mobile node detects the ultrawide band signals communicated thereto, and the detected signals are correlated with replica signals that are replicas of the ultrawide band signals, but locally-generated at the mobile node, so as not to be communicated upon the radio channels to the mobile node. Correlation values are determined that are representative of the correlations between the received ultrawide band signals and the replicas thereof. The correlations are used to estimate the channel impulse response, thereby to estimate the channel characteristics of the channel upon which the ultrawide band signal is communicated to the mobile node. And, responsive to the channel estimation, equalization operations are performed upon other data that is communicated to the mobile node to compensate for the effects of fading, or other distortion, introduced upon the data during its transmission to the mobile node and to recover the informational content of the data.

In another aspect of the present invention, the ultrawide band signals are utilized to time-synchronize the mobile node to the network part of the communication system from which the ultrawide band signals are broadcast. Due to the relatively high resolution permitted of the ultrawide band signal, the time synchronization between the mobile node and the network part of the communication system is correspondingly permitted to be of high resolution.

In a further aspect of the present invention, the ultrawide band signals, communicated by different ones of the fixed-site transceivers, and detected by a mobile node are used by the mobile node to facilitate termination of the positioning of the mobile node. Again, due to the relatively high resolution of the ultrawide band signals, relatively high resolution of positioning determination is ascertainable.

Thereby, through the utilization of ultrawide band signals in a cellular communication system or wireless local area network, the communication of data during operation of the radio communication system is facilitated. Improved equalization operations, improved time synchronization, and improved position determining of the mobile node are all facilitated.

In these and other aspects, therefore, apparatus, and an associated method, is provided for a radio communication system. The radio communication system has a network part and a mobile node selectably operable to communicate data signals by way of radio channels susceptible to fading with the network part pursuant to a communication service. Communication is facilitated between the mobile node and the network part. An ultrawide band signal detector is embodied at the mobile node. The ultrawide band signal detector detects ultrawide band signals generated by the network part. The ultrawide band signals are generated by the network part at least pseudorandomly and are communicated by way of the radio channel susceptible to fading. A signal replicator generates replica signals. The replica signals are replicas of the ultrawide band signals prior to communication thereof upon the radio channels that are susceptible to distortion. A comparator is adapted to receive indications of the ultrawide band signals detected by the ultrawide band signal detector and to receive indications of the replica signals generated by the signal replicator. The comparator compares the indications of the ultrawide band signals together with the indications of the replica signals. Comparisons made by the comparator are used to facilitate the communication between the mobile node and the network part.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIGS. 4-1, 4-2, and 4-3 represent three different pseudo-random time-hopping signals, exemplary of the three time-hopping signals broadcast throughout the cells of the sets of cells shown in FIG. 3.

DETAILED DESCRIPTION

Figure 1:
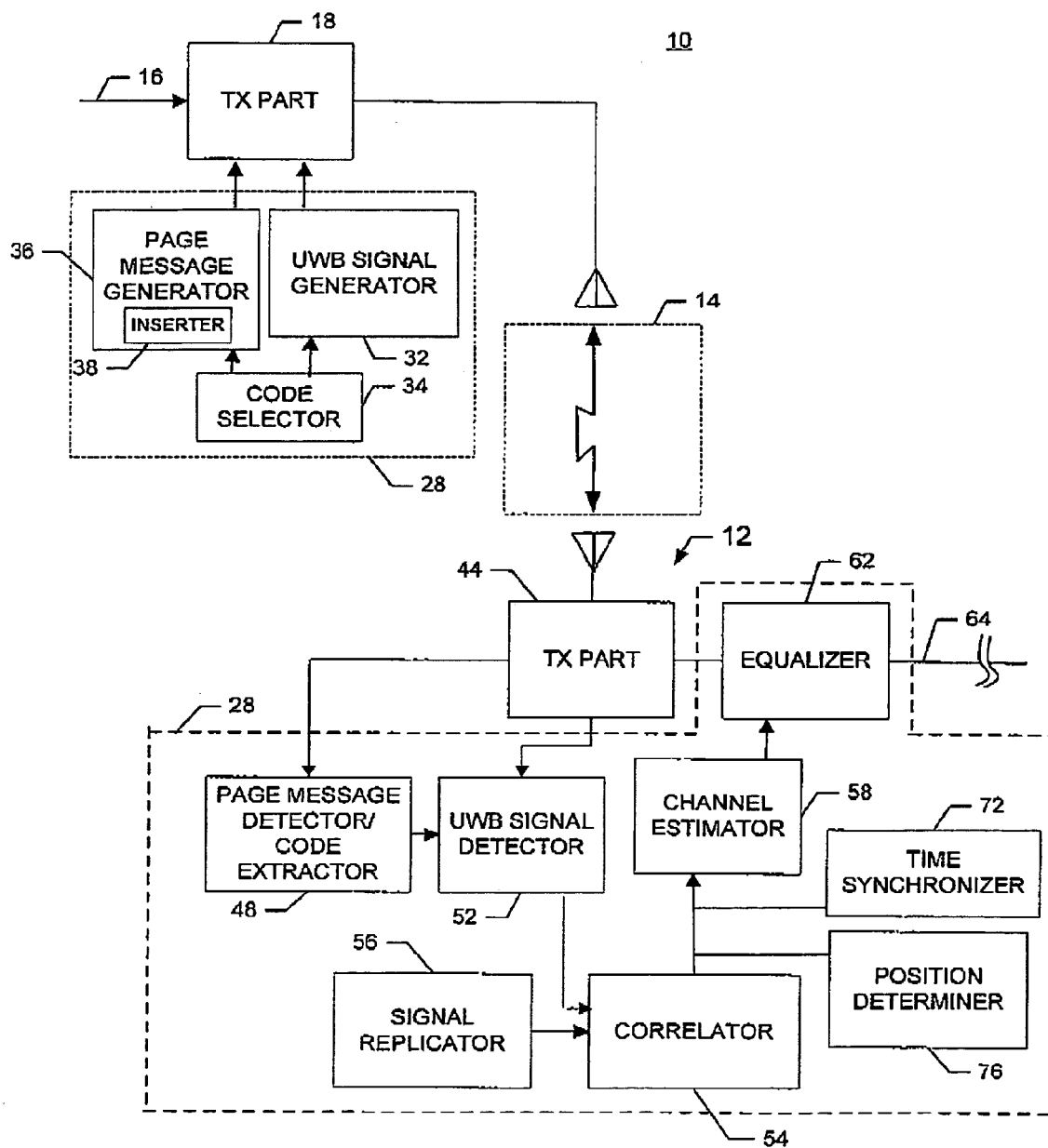
FIG. 1 illustrates a functional block diagram of a radio communication system in which an embodiment of the present invention is operable.

Referring first to FIG. 1, a radio communication system, shown generally at 10, provides for the communication of data between communication stations to effectuate communication of data therebetween. In the exemplary implementation, the radio communication system forms a cellular communication system or wireless local area network (WLAN) in which mobile nodes, of which the mobile node 12 is representative, communicate by way of radio channels defined upon a radio air interface 14 with a network part of the communication system that includes fixed-site transceivers, of which the transceivers 16 are representative. It should be noted, of course, that while the following description of exemplary operation of the communication system 10 shall be described with respect to its exemplary implementation, the communication system is also representative of other radio communication systems and that operation of an embodiment of the present invention is analogously implementable in such other communication systems. And, while exemplary operation of an embodiment of the present invention shall be described with respect to the communication of signals from the network part of the communication system to the mobile node, in another embodiment, analogous structure is used to communicate signals originated at the mobile node to the network part of the communication system. Description of operation of such other embodiment is analogous to, but generally reverse to that of, the operation of the communication system to send signals from the network part to the mobile node.

During effectuation of a communication service in which data is communicated by the network part to the mobile node, the data that is to be communicated is provided to the transmit part 18 of an appropriate fixed-site transceiver 16. Here, for purposes of explanation, the data is provided by way of the line 22 to the transmit part 18 of the top-most (as shown) fixed-site transceiver. When the communication system forms a cellular communication system, the transceiver forms a base transceiver station. And, when the communication system forms a wireless local area network, the fixed-site transceiver forms an access point. The transmit part 18 operates in conventional manner to form and to cause to be sent upon selected radio channels a data signal containing the data that is to be communicated by the network part to the mobile node. As the radio channels defined upon the radio air interface upon which the data signal is communicated is non-ideal, that is, susceptible to fading conditions and other conditions that distort the values of the data signal during its communication to the mobile node, the values of the data signal are altered as a result of such fading or other distortion. Compensation must be made at the mobile node for the distortion in order correctly to recover the informational content of the communicated data. As noted previously, while various mechanisms are conventionally utilized by which to compensate for the distortion of the values of the data during its communication to the mobile node, conventional mechanisms generally are of relatively low resolutions, limiting the ability to compensate for the distortion.

Pursuant to an embodiment of the present invention, a manner is provided by which better to facilitate operation of the communication system to, amongst other things, better provide for the compensation of distortion introduced upon data during its communication upon a fading channel. An ultrawide band signal is generated and communicated, for purposes of example, by the network part of the communication system to the mobile node.

The fixed-site transceiver includes apparatus 28 of an embodiment of the present invention. The elements shown to form portions of the apparatus are functionally represented, implementable in any desired manner, including, in part, by algorithms executable by processing circuitry.

More particularly, the apparatus includes an ultrawide band (UWB) signal generator 32 that operates to generate an ultrawide band signal that is provided to the transmit part 18 to be caused to be communicated by the fixed-site transceiver to the mobile node. The ultrawide band signal forms a low-power radio signal that is spread across a large range of frequencies, at a low signal level, i.e., of a signal strength that is less than a noise floor defined in the communication system. Here, in the exemplary implementation, the ultrawide band signals are either of a fractional band width of at least 0.25 or of a bandwidth in excess of 1 GHz, with very low power spectral densities. The fractional band width is the ratio between the bandwidth of a signal to the center frequency used to transmit the signal. An advantage of communication of an ultrawide band signal is that, due to its high bandwidth, a very high time resolution, a sub-centimeter time resolution, is obtainable.

The ultrawide band signal generated by the generator 32 is generated pursuant to a selected time-hopping code, the code of which is selected by a code selector 34. The time-hopping pattern, as shall be noted below, is reused by different fixed-site transceivers of the network part of the communication system pursuant to a time-hopping code re-use scheme. The code selector, in one implementation, is physically implemented at a centralized location, such as at a control hub or at a base station controller, by way of which to select the codes pursuant to which the ultrawide band signals generated at different fixed-site transceivers are to be generated.

The apparatus further includes a page message generator 36 that is provided with indications of the codes selected by the code selector 34. Here, the page message generator includes an inserter 38 that inserts indications of the selected code pursuant to which the ultrawide band signal generated by the ultrawide band signal generator embodied at the fixed-site transceiver is generated. The page message generated by the page message generator is applied to the transmit part 18 and is communicated in otherwise conventional manner to be detectable by the mobile node when positioned within a coverage area encompassed by the fixed-site transceiver. Through appropriate analysis of the contents of the page message, the mobile node is provided with indications of the time-hopping code pursuant to which the ultrawide band signal generated by the ultrawide band signal generator is generated.

The mobile node includes a receive part 44 that operates upon signals received at, and detected by, the mobile node.

The apparatus embodied at the mobile node includes a page message detector and code extractor 48. The detector and extractor detects page messages received at an operated upon by the receive part 44, thereby to extract the time-hopping code indication contained in the page message. Extracted indications are provided to an ultrawide band (UWB) signal detector 52. The signal detector operates, at least during the times identified by the code extractor, to detect the ultrawide band signal generated pursuant to the time-hopping code. Indications of detections made by the signal detector are provided to a correlator 54. The apparatus further includes a signal replicator 56. The signal replicator operates to form a replicated signal, a replica of the ultrawide band signal generated by the fixed-site transceiver. Because the replica is locally-generated, e.g., at the mobile node, the replica signal is a replica of the signal actually generated by the fixed-site transceiver, not the signal received at the mobile node, altered as a result of fading and other distortion. The detector and code extractor 48 provides the signal replicator with indications of the time-hopping sequence pursuant to which the ultrawide band signal is generated, and the replicated signal is a replica of such signal.

The correlator 54 performs correlations between the detected signal and the replica signal, and indications of the calculated correlation is provided to a channel estimator 58. The channel estimator estimates the channel impulse response (CIR) or other channel indicia of the channel based upon the correlations made by the correlator. And, channel estimations are provided to an equalizer 62 that is also coupled to the receive part 44. The equalizer performs equalization operations upon data symbols provided thereto by the receive part to form equalizer outputs on the line 64 that is provided to other receive path elements. Because of the high resolution of the ultrawide band signal, the channel estimate formed from the correlations thereof are correspondingly of high resolutions. Improved operations of the equalizer is permitted as the channel impulse response of the channel estimate is of improved resolution.

In a further implementation, the apparatus further includes a time synchronizer 72 also adapted to receive indications of correlations performed by the correlator 54. The time synchronizer operates to time-synchronize the mobile node to the network part based upon the ultrawide band signal detected at the mobile node and correlated with the replica signal by the correlator. Due to the high resolution of the ultrawide band signal, the resolution of the time synchronization provided by the time synchronizer is also of improved resolution levels.

In a further embodiment of the present invention, the mobile node is positioned to detect the ultrawide band signals generated by two or more fixed-site transceivers. That is to say, page messages are detected by the two or more fixed-site transceivers, the code information is extracted therefrom, and the ultrawide band signals generated by the fixed-site transceivers are detected. Correlations are performed, and the position detector 76 determines the positioning of the mobile node based upon the detection of the two or more signals.

The ultrawide band signal that is communicated by a communication station during operation of the communication system 10 is communicated concurrent with communication of data signals so that the ultrawide band signal is overlaid thereon, that is to say, forms a ultrawide band overlay signal. The sending station is assigned with a unique pseudo-random time-hopping sequence at which the overlay signal is transmitted, and the ultrawide band signal is broadcast using a paging, or other appropriate, channel. A paging message is sent to the mobile node to indicate to the mobile node when the mobile node should attempt to detect the ultrawide band signal. Information broadcast upon the paging channel identifies to the mobile node not only when the ultrawide band signal of interest is broadcast, but also to distinguish between ultrawide band signal transmissions that are transmitted from different sending stations due to the separation in time of the ultrawide band signals transmitted from the different ones of the sending stations.

An appropriate re-use scheme of the time-hopping sequences pursuant to which ultrawide band signals are generated by different sending stations is based upon various factors. For instance, the separation distance and interference between two sending stations is used to determine the appropriateness of the code re-use. If, for instance, the two sending stations are separated by large distances, the same ultrawide band, pseudo-random time-hopping code can be used at each of the sending stations.

Figure 2:
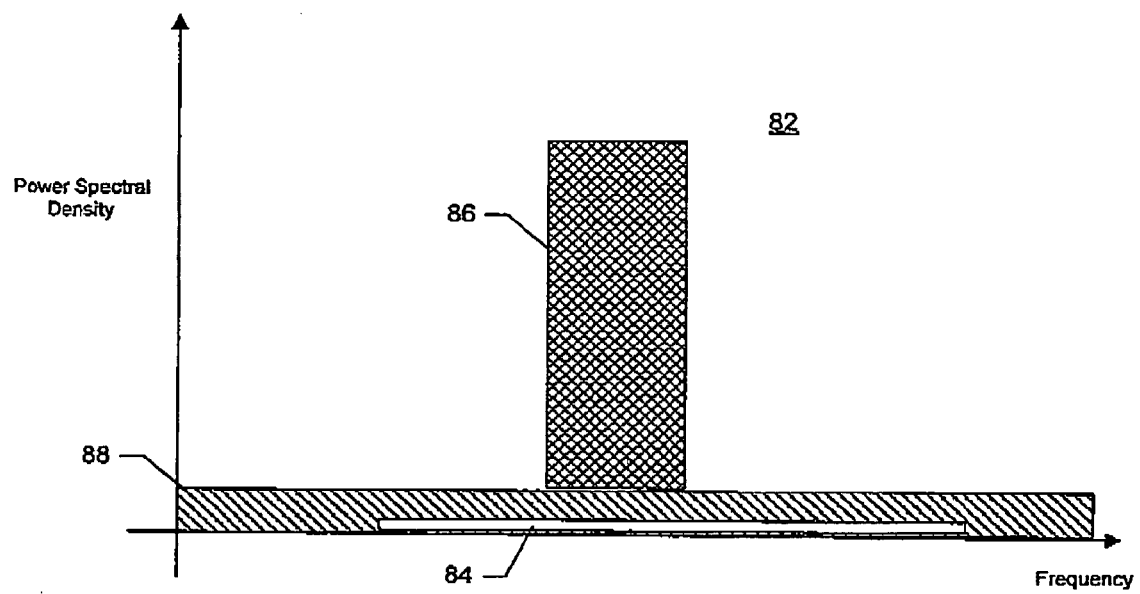
FIG. 2 illustrates a graphical representation of the power levels of an exemplary ultrawide band signal generated during operation of the communication system in FIG. 1 together with a data signal, also generated during operation of the communication system shown in FIG. 1.

FIG. 2 illustrates an exemplary graphical representation, shown generally at 82, of the power spectrum of the ultrawide band signal, here indicated at 84, and an exemplary data signal, here represented at 86. The noise floor 88 defined in the communication system is also indicated. Review of the representation indicates that the ultrawide band signal 84 is of a power level less than the noise floor while the power level of the data signal 86 is significantly above the noise floor. And, also as indicated, the bandwidth of the ultrawide band signal is significantly larger than the bandwidth of the data signal.

Figure 3:
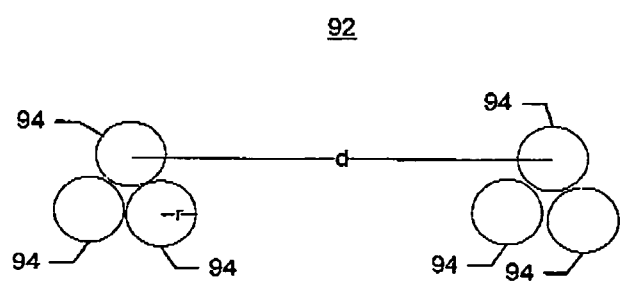
FIG. 3 illustrates a representation of exemplary sets of cells defined by a radio communication system and pursuant to which a time-hopping code reuse scheme is employed.
Figures 1, 4:
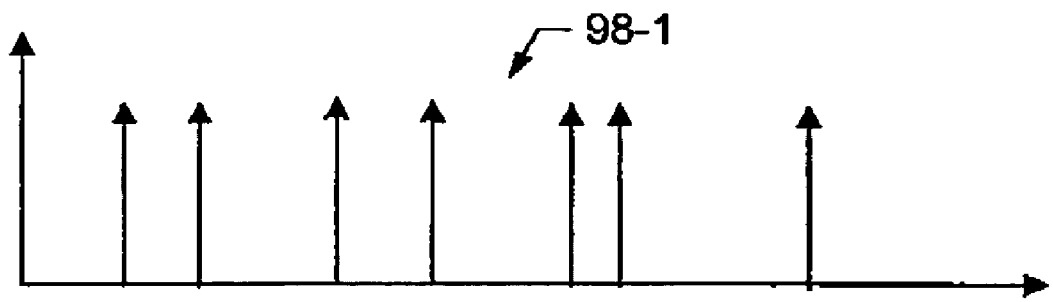
Figures 2, 4:
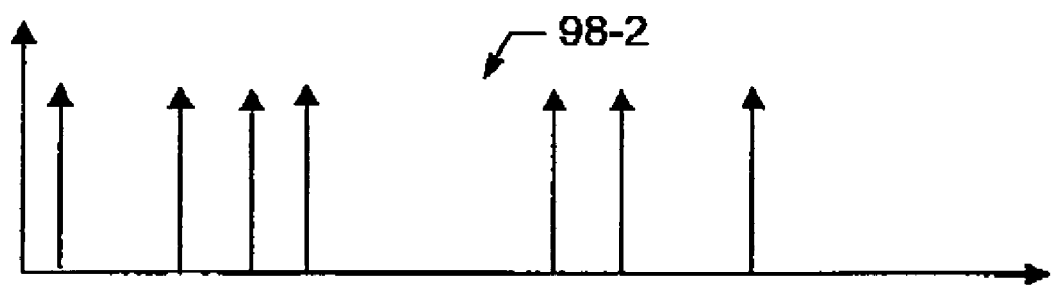
Figures 3, 4:
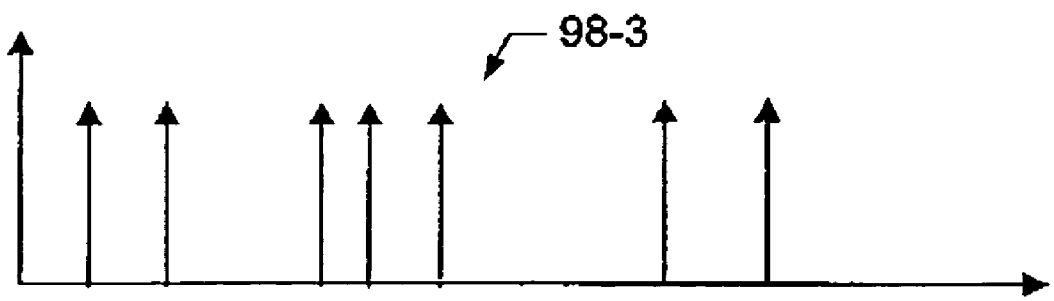

FIG. 3 illustrates a representation, shown generally at 92, of two sets of coverage areas 94, each coverage area defined by a different fixed-site transceiver 16. The three left-most (as shown) coverage areas utilize ultrawide band signals of a first set of three different time-hopping sequences. A distance d away, at the right-most (as shown) set of coverage areas 94 reuse the set of three time-hopping sequences.

FIGS. 4-1, 4-2, and 4-3 illustrate representations of first, second, and third time-hopping sequences 98-1, 98-2, and 98-3, respectively. The times at which pulses of the signals are sent do not overlap, thereby avoiding the possibility that cumulative power levels of the different ultrawide band signals together aggregate above the noise floor of the communication system.

Figure 5:
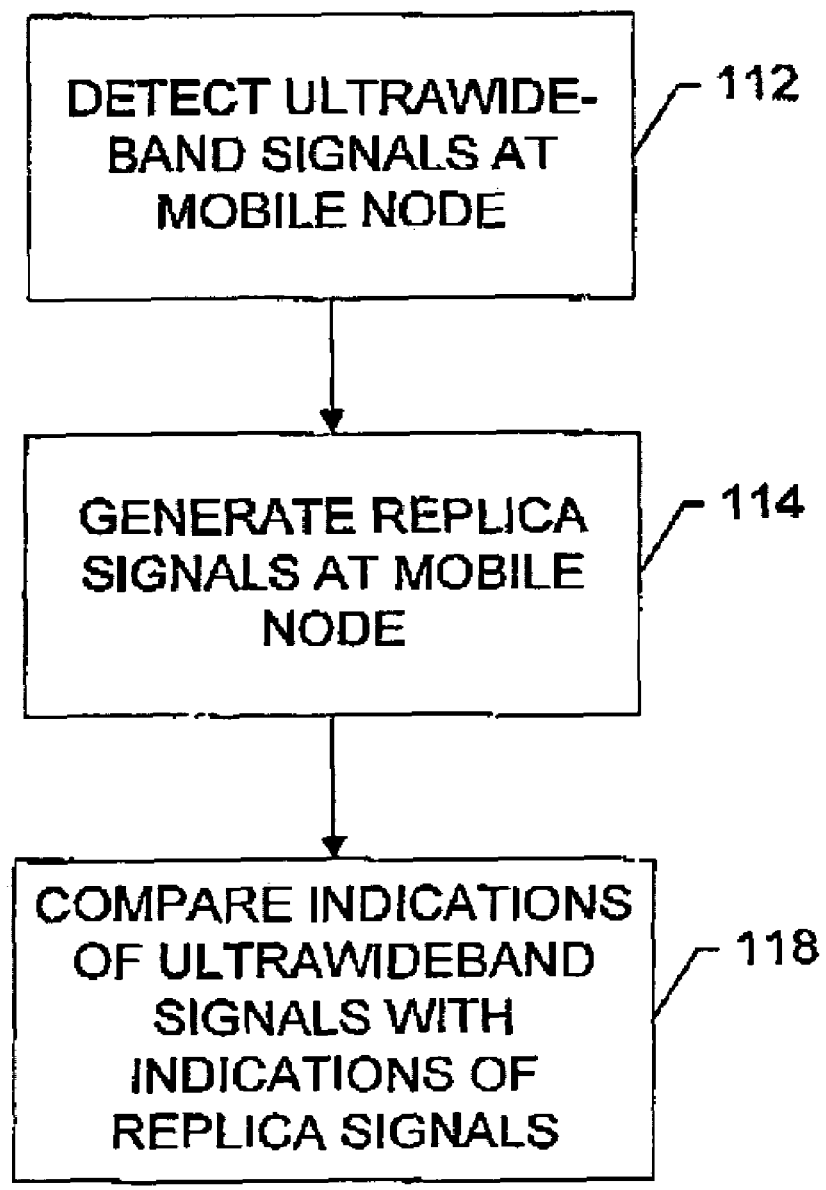
FIG. 5 illustrates a method flow diagram listing the method steps of the method of operation of an embodiment of the present invention.

FIG. 5 illustrates a method, shown generally at 108, representative of the method of operation of an embodiment of the present invention. The method facilitates communications in a radio communication system, such as the communication system 10 shown in FIG. 1.

First, and as indicated by the block 112, detection is made at a mobile node of ultrawide band signals generated by a network part of the communication system. The ultrawide band signals are generated at the network part at least pseudo-randomly and are communicated by way of a radio channel susceptible to fading.

Then, and as indicated by the block 114, replica signals are generated at the mobile node. The replica signals are replicas of the ultrawide band signals prior to their communication upon the radio channels. And, as indicated by the block 118, indications of the ultrawide band signals are compared together with indications of the replica signals. Comparisons made therebetween are used to facilitate the communication between the mobile node and the network part.

Because the ultrawide band signals of low power levels but of high resolutions are communicated, improved operation of the mobile node in the communication system is possible. Improved resolution of channel estimations permit improved equalization operations of received data. And, improved time synchronization of the mobile node is also permitted. And, improved resolution of position determination of the mobile node is also provided through use of and analysis of the ultrawide band signals of the high resolutions.

The previous descriptions are of preferred examples for implementing the invention, and the scope of the invention should not necessarily be limited by this description. The scope of the present invention is defined by the following claims.

What is claimed is:

1. Apparatus for a radio communication system having a network part and a mobile node selectably operable to communicate data signals by way of radio channels susceptible to fading with the network part pursuant to a communication service, said apparatus for facilitating communication between the mobile node and the network part, said apparatus comprising:

an ultrawide band signal detector embodied at the mobile node, said ultrawide band signal detector for detecting ultrawide band signals generated by the network part, the ultrawide band signals generated by the network part at least pseudo-randomly and communicated by way of the radio channels susceptible to fading;

a signal replicator for generating replica signals, the replica signals replicas of the ultrawide band signals prior to communication thereof upon the radio channels that are susceptible to distortion;

a comparator adapted to receive indications of the ultrawide band signals detected by said ultrawide band signal detector and to receive the replica signals generated by said signal replicate, said comparator for comparing the indications of the ultrawide band signals together with the replica signals, comparisons made by said comparator used to facilitate the communication between the mobile node and the network part.

2. The apparatus of claim 1 wherein said comparator comprises a correlator and wherein the comparisons made between the indications of the ultrawide band signals and the replica signals comprise correlations therebetween.

3. The apparatus of claim 1 wherein the ultrawide band signals generated at least pseudo-randomly by the network part and detected by said ultrawide band signal detector are generated pursuant to a pseudorandom time hopping code and wherein the replica signal generated by said signal replicator is also generated pursuant to the pseudorandom time-hopping code.

4. The apparatus of claim 1 further comprising a channel estimator adapted to receive indications of the comparisons made by said comparator, said channel estimator for estimating channel conditions of the radio channels upon which the data signals are communicated responsive at least in part to the comparisons made by said comparator.

5. The apparatus of claim 4 further comprising an equalizer adapted to receive indications of the data signals communicated to the mobile node and to receive indications of channel estimations made by said channel estimator, said equalizer for equalizing the data signals responsive to estimations of the channel conditions estimated by said channel estimator.

6. The apparatus of claim 1 wherein the radio communication system defines a power level threshold forming a noise floor, wherein the data signals communicated pursuant to the communication service are communicated at power levels greater than the noise floor and wherein the ultrawide band signals detected by said ultrawide band signal detector are communicated at signal levels beneath the noise floor.

7. The apparatus of claim 6 wherein the data signals communicated pursuant to die communication service are of first selected bandwidths and wherein the ultrawide band signals detected by said ultrawide band signal detector are of second selected bandwidths, the second selected bandwidths greater than the first selected bandwidths.

8. The apparatus of claim 1 further comprising a time synchronizer adapted to receive indications of the comparisons made by said comparator, said time synchronizer for time synchronizing the mobile node with the network part.

9. The apparatus of claim 1 wherein the network part comprises a first fixed-site communication station positioned at a first location and at least a second fixed-site communication station positioned at least at a second location, and wherein said ultrawide band signal detector detects ultrawide band signals communicated by the first and at least second fixed-site communication stations, respectively.

10. The apparatus of claim 9 further comprising a position determiner adapted to receive indications of the comparisons made by said comparator, said position determiner for at least facilitating determinations of positioning of the mobile node responsive to the indications of the comparisons.

11. In the radio communication system of claim 1, a further improvement of apparatus for the network part for facilitating communication between the mobile node and the network part, said apparatus comprising:

an ultrawide band signal generator embodied at the network part, said ultrawide band signal generator for generating the ultrawide band signals for communication to the mobile node.

12. The apparatus of claim 11 further comprising a time-hopping code selector for selecting at least a first selected time-hopping code, wherein said ultrawide band signal generator is adapted to receive indications of the at least the first selected code selected by said time-hopping code selector, ultrawide band signals generated by said ultrawide band signal generator generated pursuant to selections made by said time-hopping code selector.

13. The apparatus of claim 12 wherein the network part comprises a first fixed-site communication station and at least a second fixed-site communication station, wherein said ultrawide band signal generator comprises a first ultrawide band signal generator at the first fixed-site communication station and a second ultrawide band signal generator embodied at the second fixed-site communication station, and wherein said time-bopping code selector selects a first time-hopping code to be utilized by said first ultrawide band signal detector and a second time-hopping code to be utilized by said second ultrawide band signal generator.

14. The apparatus of claim 12 wherein the network broadcasts control information on a control channel, and wherein said apparatus further comprises a time-hopping code identification inserter adapted to receive indications of selections made by said time-hopping code selector, said time-hopping code identification inserter for inserting the indications of the selections into the control information broadcast on the control channel.

15. The apparatus of claim 14 wherein the mobile node monitors the control information broadcast by the network part, said apparatus further comprising a code-selection extractor embodied at the mobile node, said code-selection extractor for extracting the indication of the selections contained in the control broadcasts.

16. A method for facilitating communication in a radio communication system having a network part and a mobile node selectably operable to communicate data signals, by way of radio channels susceptible to fading, pursuant to a communication service, said method comprising the operations of:

detecting, at the mobile node, ultrawide band signals generated by the network part, the ultrawide band signals generated at the network part at least pseudo-randomly and communicated by way of the radio channels susceptible to fading;

generating replica signals at the mobile node that are replicas of the ultrawide band signals prior to communication thereof upon the radio channels that arc susceptible to distortion;

comparing indications of the ultrawide band signals together with the replica signals, comparisons made therebetween used to facilitate the communication between the mobile node and the network part.

17. The method of claim 16 wherein the radio communication system defines a power level threshold forming a noise floor, wherein the data signals communicated pursuant to the communication service are communicated at power levels greater than the noise floor, and wherein the ultrawide band signals detected during said operation of detecting are communicated at signal levels beneath the noise floor.

18. The method of claim 16 further comprising the operation of estimating channel conditions of the radio channels upon which the data signals are communicated responsive at least in part to comparisons made during said operation of comparing.

19. The method of claim 16 farther comprising the operation of time-synchronizing the mobile node with the network part responsive to comparisons made during said operation of comparing.

20. The method of claim 16 farther comprising the operation of determining where the mobile node is positioned responsive, at least in part, to comparisons made during said operation of comparing.

* * * * *

UNITED STATES PATENT AND TRADEMARK OFFICE
CERTIFICATE OF CORRECTION

PATENT NO.        : 7,174,141 B2
APPLICATION NO.   : 10/836632
DATED             : February 6, 2007
INVENTOR(S)       : Green et al.

It is certified that error appears in the above-identified patent and that said Letters Patent is hereby corrected as shown below:

Column 9,
Line 65, "replicate" should read --replicator--.

Column 10,
Line 35, "die" should read --the--.

Column 11,
Line 12, "bopping" should read --hopping--.

Column 12,
Line 8, "arc" should read --are--;
Lines 26 and 30, "farther" should read --further--.

Signed and Sealed this

Fifteenth Day of May, 2007

JON W. DUDAS
*Director of the United States Patent and Trademark Office*